LIPPY & BRADLEY.
Thrasher.
No. 40,695.
Patented Nov. 24, 1863.
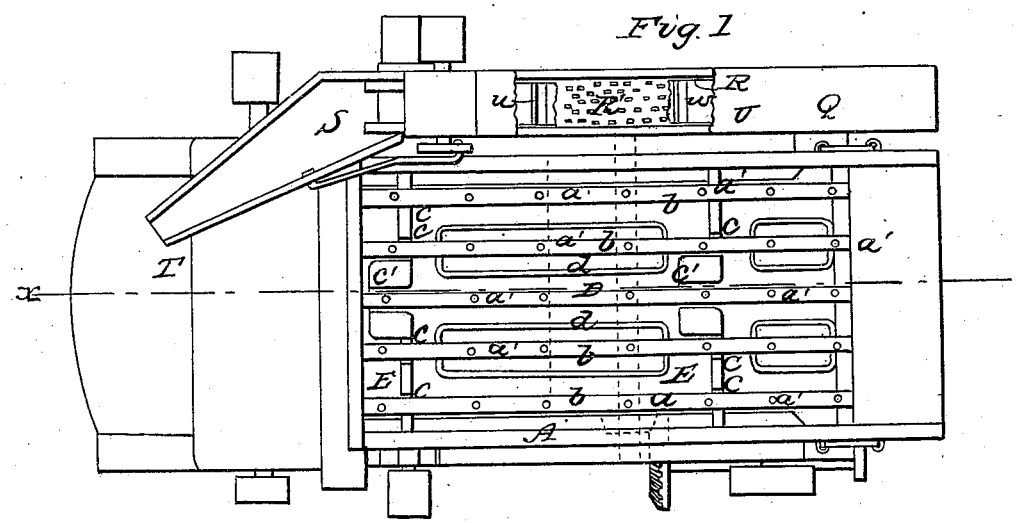
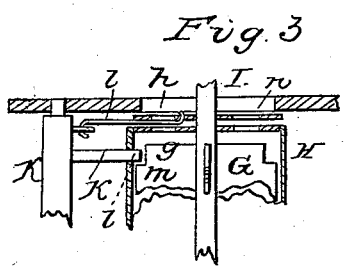
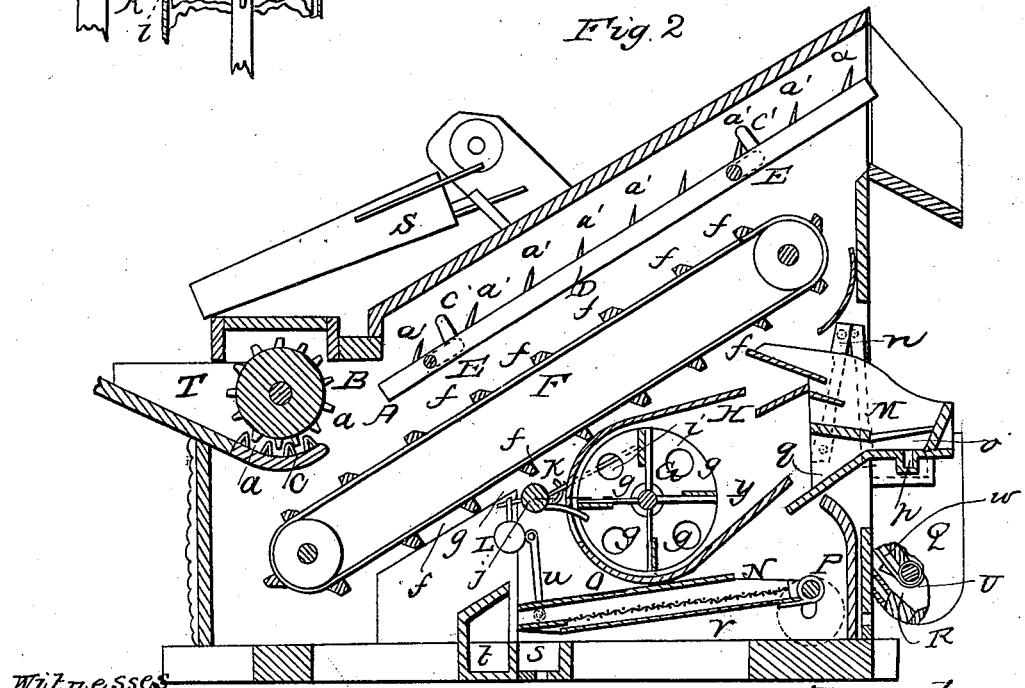

UNITED STATES PATENT OFFICE.

DAVID LIPPY AND JAMES S. BRADLEY, OF MANSFIELD, OHIO.

IMPROVEMENT IN THRASHERS.

Specification forming part of Letters Patent No. 40,695, dated November 24, 1863.

*To all whom it may concern:*

Be it known that we, D. LIPPY and J. S. BRADLEY, both of Mansfield, in the county of Richland and State of Ohio, have invented a new and Improved Grain Thrashing and Separating Machine; and we do hereby declare that the following is a full, clear, and exact description of the same, reference being had to the accompanying drawings, making a part of this specification, in which—

Figure 1 is a plan or top view of our invention; Fig. 2, a side sectional view of the same, taken in the line $x\,x$, Fig. 1; Fig. 3, a horizontal section of a portion of the same, taken in the line $y\,y$, Fig. 2.

Similar letters of reference indicate corresponding parts in the several figures.

To enable those skilled in the art to fully understand and construct our invention, we will proceed to describe it.

A represents a box or case, in one end of which a thrashing cylinder, B, is placed, and a concave, C, immediately below it. The cylinder and concave are both provided with teeth $a$, and are arranged in the usual way. (See Fig. 2.)

D represents a straw-carrier, which is composed of a series of parallel bars, $b$, fitted near their ends upon the cranks $c\,c\,c'$ of shafts E E. The bars $b$ are provided with teeth $a'$, and they have an inclined position, as shown in Fig. 2. Each shaft E is provided with three cranks, two of them, $c\,c$, being near the ends of the shafts and in reverse positions relatively with each other, and the central one, $c'$, being at right angles to the others. To two of the bars $b$ wires or rods $d$ are attached, which project from opposite sides of them to prevent straw from passing down between the bars. The lower ends of the bars $b$ have such a relative position with the cylinder and concave B C that they will receive the straw as it comes from the thrashing-cylinder, and the movement which is communicated to said bars through the medium of the cranks $c\,c\,c'$ of the shafts E E, which is a longitudinal curvilinear movement, causes the straw to be carried upward and discharged from the elevated ends of the bars $b$. Owing to the difference in the position of the cranks $c\,c\,c'$, the bars $b$ do not rise and fall simultaneously with each other, but move irregularly, and hence subject the straw to a shaking movement, which causes the grain to fall through the straw and between the bars $b$ and down upon a grain conveyer, F, which is composed of an endless apron, $e$, having bars $f$ attached to it transversely at equal distances apart. The apron $e$ is inclined so as to be about parallel with the bars $b$ of the straw-carrier D, as shown clearly in Fig. 2.

Directly below the grain-conveyer F a fan, G, is placed. This fan may be constructed in the usual way, and it is fitted within a case, H, the ends of which are perforated with holes $g$, as shown clearly in Fig. 2. At the outer side of each end of the case H there is a circular disk, I, and these disks are perforated with holes $h$ precisely similar to the holes $g$ in the ends of the fan-case. The disks I are fitted loosely on the fan-shaft J, and they are connected by rods $i$ to a shaft K, which is directly back of the fan-case H, and has an arm, $j$, projecting from it on which a weight, L, is suspended. This weight L has a tendency to keep the holes $h$ in line or to register with the holes $g$ in the ends of the fan-case H. The shaft K has two arms or plates, $k\,k$, projecting from it, one from near each end of the shaft. These arms extend through slots $l$ in the back part of the fan-case H, and the blades or wings $m$ of the fan are notched at their ends, so that in rotating they will not come in contact with the arms or plates $k\,k$. (See Fig. 3.)

M is a shoe, which is suspended within the box or case A by elastic plates $n$. This shoe is provided with a screen, $o$, underneath the front end of which there is a discharge-spout, $p$, and back of said spout an inclined plane or chute, $q$, as shown clearly in Fig. 2.

N is a screen, which is placed in the lower part of the box or case A. This screen is fitted within a shallow box, $o$, the bottom $r$ of which, below the screen, serves as a chute, and has a discharge-spout, $s$, under its lower end, a discharge-spout, $t$, being under the lower end of the screen, as shown in Fig. 2. The box O is suspended at its lower or depressed end by rods $u$, and the elevated end of the box O is connected to a crank-shaft, P, which as it rotates communicates a longitudinal shake movement to the box O. The discharge-spout $p$ under the front end of the shoe M leads into the lower end of an inclined elevator-box, Q, which is attached to one side of the box or case A, and is provided with elevators R, formed of an endless belt, $v$, having projections or ribs $w$ attached to it transversely at equal distances apart. (See Fig. 1.) Within the elevator-box Q there is placed below the belt $v$ a screen, R'. (Shown in Figs. 1 and 2.)

The operation is as follows: The straw, as before stated, is carried up by the straw-carrier D, and discharged from the elevated end thereof, while the grain passes down upon the conveyer F, which discharges it into the shoe M, where it is subjected to a blast from the fan G and deprived of all light foreign substances. The sound grain will pass through the inner part of the screen $o$, and be conducted by the chute $q$ upon the screen N, through which cockle and foreign substances smaller than the grain pass, and are conducted by the bottom $r$ of the box O into the spout $s$, while the wheat passes over the screen N and is discharged into the spout $t$. The grain that passes into the spout $p$ is conveyed by the latter into the lower part of the elevator-box Q, and is carried upward over the screen R' by the projections or ribs $w$ on the belt $v$ and deprived of all dust and fine impurities. The grain passes out of the upper end of the elevator-box Q into an inclined trough, S, which conveys it into a hopper, T, from whence it again passes through the machine. The shoe M has a lateral shake movement communicated to it by any proper means, and the other working parts described may be driven by belts or gearing. The blast from the fan G is rendered uniform by means of the perforated ends of the fan-case H and the perforated disks I, the holes of which are made to register with the holes in the ends of the fan-case by means of the shaft K and weight L. When the speed of the fan G increases so as to increase the strength of the blast beyond a certain degree, the wind will actuate the plates $k$ $k$, and thereby turn the shaft K, which, through the medium of the rods $i$ and the holes $g$ in the ends of the fan-case, will be partially closed by the disks $i$, which turn freely on the fan-shaft, and the supply of air to the fan G partially checked or cut off, so as to diminish the blast.

Having thus described our invention, what we claim as new, and desire to secure by Letters Patent, is—

1. The screen R' in the elevator-box Q, arranged in combination with the elevators R, to operate in connection therewith, as and for the purpose herein set forth.

2. The screen N, placed within a box, O, below the shoe M, and arranged to operate in connection therewith, as and for the purpose specified.

3. The combination of the grain-conveyer F, straw-carrier D, shoe M, elevators R, fan G, and screen N, all arranged in connection with the thrashing-cylinder B and concave C, to operate as described.

DAVID LIPPY.
JAMES S. BRADLEY.

Witnesses:
JOHN WISE,
L. B. EBERLY.